Feb. 14, 1967     B. A. AULD     3,304,520
VARIABLE ELASTIC WAVE DEFLECTION
Filed Nov. 23, 1964     2 Sheets-Sheet 1

INVENTOR
B. A. AULD
BY
ATTORNEY

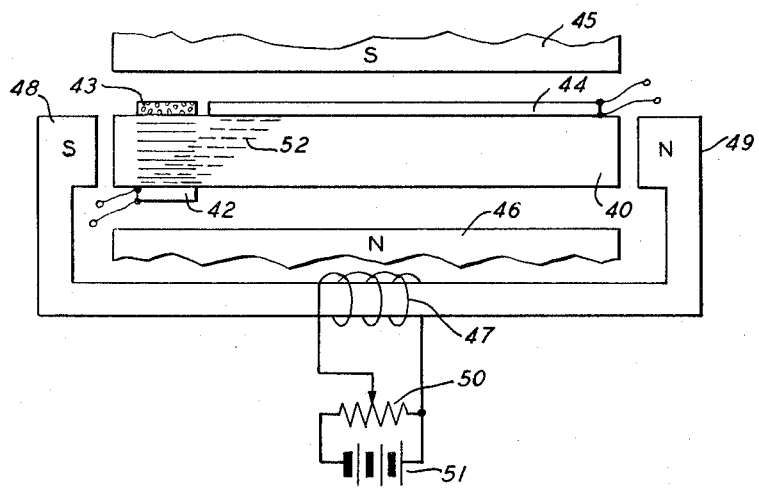
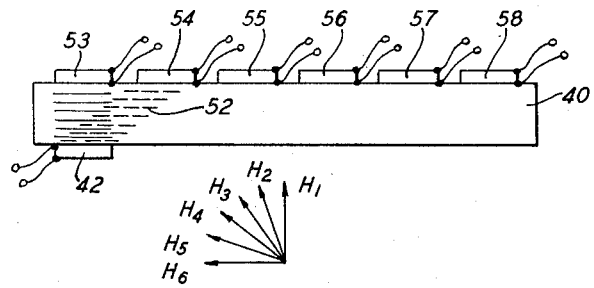
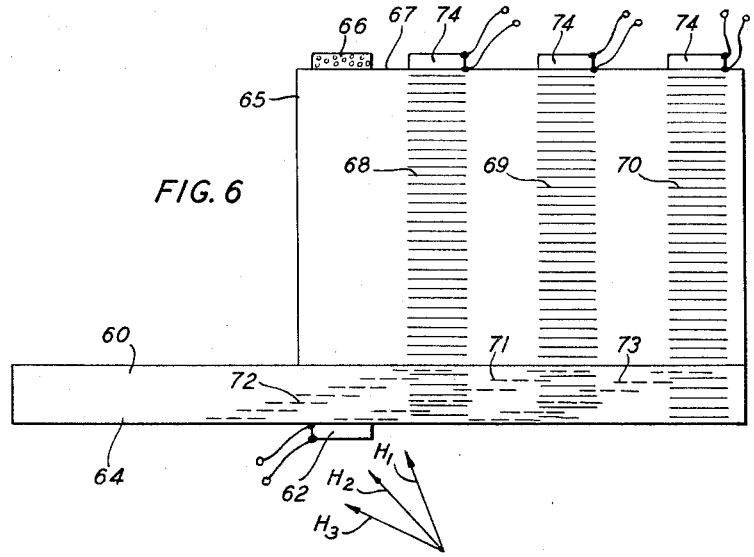

3,304,520
VARIABLE ELASTIC WAVE DEFLECTION
Bert A. Auld, Menlo Park, Calif., assignor to Bell Telephone Laboratories, Incorporated, New York, N.Y., a corporation of New York
Filed Nov. 23, 1964, Ser. No. 413,243
8 Claims. (Cl. 333—7)

This invention relates to elastic wave transmission systems, and, more particularly, to methods and means for directing the wavefront of elastic wave energy in said systems.

The traditional use of elastic waves in delay lines takes advantage of the fact that the velocity of propagation of an elastic wave vibration or an ultrasonic wave is much lower than that of electrical signals by transforming the electrical signal into an elastic wave, sending the elastic wave down a mechanical wave transmission medium, and reconverting the wave into an electrical signal at the far end. Recently, however, elastic wave amplifiers, modulators, detectors, filters, as well as improved transducers and other components have greatly extended the possible fields of use. It has become more and more important to be able to control the elastic wave beam itself. For example, in my copending application, Serial No. 401,902, filed October 6, 1964, it is taught how to focus an elastic wave into a beam for propagation along a wave transmission medium.

It is now an object of the present invention to controllably direct the wavefront of elastic wave energy.

In accordance with the invention, it has been discovered that an elastic wave propagating through a magnetized gyromagnetic material interacts with the magnetic spins therein in a way which influences the velocity of the elastic wave. When the medium is magnetically polarized along a given axis, the interaction causes the phase velocity of an elastic wave propagating at an angle to this axis to be shifted with respect to the phase velocity of a wave propagating along the axis. This anisotropic property deflects the wave away from the magnetic axis by an amount dependent upon the angle between the incident wave direction and the magnetic axis.

It is a more specific object of the invention to deflect, control, steer or vary the direction of propagation of an elastic wave in a mechanical medium.

It is a further object of the invention to direct a beam of elastic wave energy at will toward different points of reception, reflection, propagation or storage.

This last-mentioned object is accomplished in the several specific embodiments of the invention which make use of elastic wave deflection in magnetized media. According to a first embodiment, an elastic wave beam is initially directed along a path between input and output transducers of short length and short delay. It is then deflected into increasingly longer physical paths of longer delay to produce an electrically variable delay line. According to another embodiment, an elastic beam is deflected in discrete steps to scan an array of individual output transducers to switch the output into different electrical circuits. In a final embodiment a discrete deflection couples or uncouples an input transducer to and from an otherwise independent wave propagation path.

Other objects and features, the nature of the present invention and its various advantages, will appear more fully upon consideration of the specific illustrative embodiments shown in the accompanying drawings and described in detail in the following explanation of these drawings, in which:

FIG. 1 is a schematic plane view of components illustrating the basic principles of magnetic elastic wave deflection in accordance with the invention;

FIG. 2, given for the purpose of explanation, is a typical dispersion characteristic showing the relationship between the frequency and wave number of transverse elastic waves and spin waves in the magnetic member of FIG. 1;

FIG. 3, given for the purpose of explanation, is a schematic diagram of a plane view of a typical wave vector surface for magnetoelastic waves propagating in a magnetic member;

FIG. 4 is a plane view of an illustrative delay line application of the principles of the invention;

FIG. 5 is a plane view of an illustrative switching application of the principles of the invention; and FIG. 6 is a plane view of an illustrative memory application of the principles of the invention.

Figure 1:
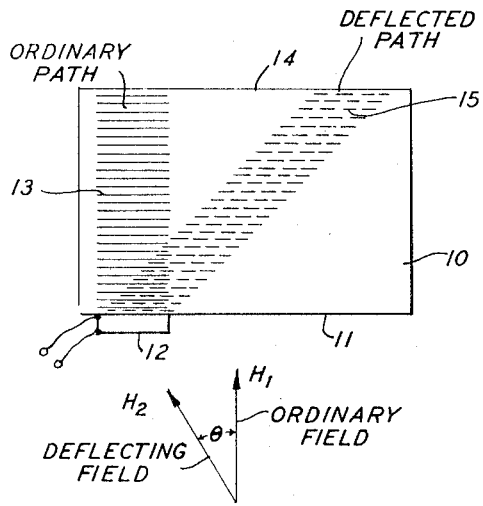

Referring more particularly in FIG. 1, the basic component employed for elastic wave deflection in accordance with the invention comprises a magnetically polarized body 10 of gyromagnetic material. For example, body 10 may be in the shape of a rectangular plate and is preferably formed from a single crystal of nonconductive ferromagnetic material (the term including appropriate ferrimagnetic materials) of the type having substantial gyromagnetic properties, reasonably low magnetic losses, large magnetoelastic coupling constants, and high acoustical Q. Suitable for this purpose are yttrium iron garnet, lithium ferrite, europium iron garnet and other nonconducting ferrimagnetic and ferromagnetic materials.

Means are provided on the lower face 11 of plate 10 for converting an electrical input signal into an elastic wave in plate 10 propagating therein with a wavefront parallel to face 11 and in turn for coupling an elastic wave arriving at face 11 to an electrical output load. This means may be a conventional piezoelectric ceramic, crystal, or magnetic transducer 12 bonded to face 11 by standard techniques so that when the transducer is excited by an alternating voltage, a linearly polarized shear mode, a circularly polarized shear mode or a longitudinal mode of elastic vibration is launched in plate 10. The particular characteristic of each of these modes and transducers particularly suited for each will be considered hereinafter.

Means are provided for applying to plate 10 a steady, biasing magnetic field capable of being directed alternatively through plate 10 at various angles to face 11. This means is schematically illustrated in FIG. 1 only by the vector $H_1$ normal to face 11 and by the alternative vector $H_2$ at an angle $\theta$ to $H_1$. Physical magnetic structures capable of producing such a field are obvious to those skilled in the art and an illustrative structure will be disclosed in connection with FIG. 4.

In the absence of either field $H_1$ or $H_2$ the elastic wave launched by transducer 12 will travel into plate 10 along the path 13 in a direction perpendicular to face 11 and the face of transducer 12. The discontinuity presented by face 14 opposite and parallel to face 11 will reflect the waves back to transducer 12.

When field $H_1$ is applied of such strength to bias the material of plate 10 into the region of magnetoelastic interaction at the frequency of signals applied to transducer 12 an elastic wave entering plate 10 from transducer 12 will be strongly coupled to spins within plate 10. As a result the velocity of the coupled magnetoelastic wave will be altered but the propagation direction of the beam continues along the direction of the biasing field. On the other hand, when the field direction is shifted through the angle $\theta$ as represented by vector $H_2$ so that it makes an angle to one side of the direction in which the elastic waves are launched by transducer 12, the magnetoelastic waves are deflected to the other side as represented by path 15. Certain characteristics are unique to this form of deflection: the wavefront remains parallel to face 11 even as the deflection occurs; upon encountering surface 14 the wave does not obey the ordinary rules of reflection for isotropic media, but instead returns along path 15. A qualitative explanation of these and other characteristics will now be given in connection with FIGS. 2 and 3.

Figure 2:
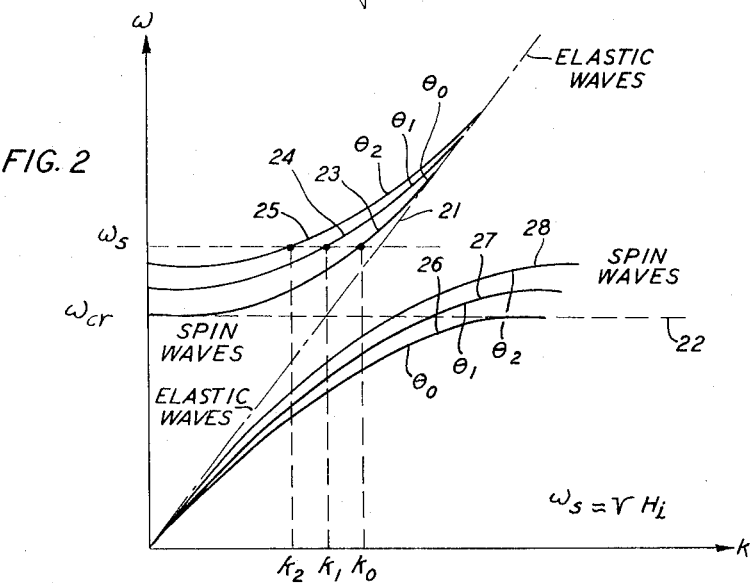

FIG. 2 shows a part of the dispersion characteristic for spin waves and transverse elastic waves including the effect of magnetoelastic interaction. A full development of this characteristic along with the equations which underlie it may be found in a paper entitled "Generation of Phonons in High-Power Ferromgnetic Resonance Experiments" by Ernst Schlomann in the Journal of Applied Physics, vol. 3, page 1647, September 1960. Particularly, FIG. 2 shows the relation between angular frequency $\omega$ and the wave vector $k$, where the magnitude of $k$ is given by $$k = 2\pi/\lambda \quad (1)$$

and $\lambda$ is the wavelength. The direction of the vector $k$ is normal to the launched wavefront, i.e., normal to the face of transducer 12 of FIG. 1.

In the absence of magnetoelastic interaction, the dashed curve 21 represents pure transverse elastic waves and the dashed curve 22 represents pure spin waves. The solid curves represent waves in the presence of magnetoelastic interaction. Thus, curves 23, 24 and 25 are referred to as the upper branch and give the relation between $\omega$ and $k$ for different values of the angle $\theta$ between the direction of $k$ and the direction of the biasing field. Similar curves 26, 27 and 28 represent the corresponding waves of the lower branch. In particular, curves 26 and 23 are for $\theta$ equal to zero. For propagation angles $\theta_1$ and $\theta_2$ greater than zero, curves 27 and 28 are typical. For low values of $k$, the waves of the upper branch are essentially spin while for high values of $k$ they are essentially elastic. Between these extremes, the elastic and spin waves are strongly coupled and are properly called magnetoelastic waves. The art has designated this region as the cross-over region. The cross-over frequency $\omega_{cr}$ is a function of the biasing field $H_i$ according to the relationship $$\omega_{cr} = \gamma H_i \quad (2)$$

where $\gamma$ is the gyromagnetic ratio of the particular material under consideration and $H_i$ is the internal field after accounting for demagnetizing factors.

Operation in accordance with the invention may be upon either the upper or lower branches and may be adequately illustrated by description only of the operation upon the upper branch for a given signal frequency $\omega_s$. For this purpose, the field strength within rod 14 is adjusted so that the field $H_i$ is approximately $\omega_s/\gamma$.

Figure 3:
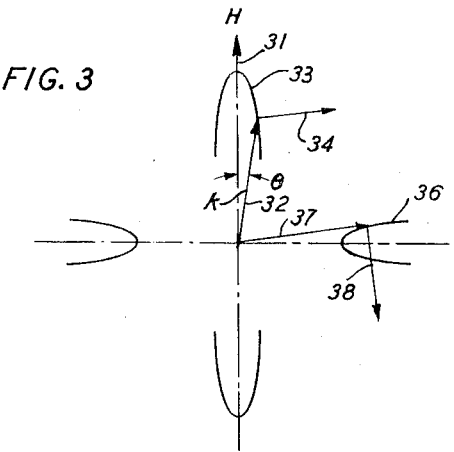

It will now be noted that the wave number $k$ is a function of the angle $\theta$ which the wave vector makes with the applied field, i.e., $k$ equals $k_0$ for $\theta_0$; $k_1$ for $\theta_1$; and $k_2$ for $\theta_2$. This fact is represented on FIG. 2 by the intersection of ordinate value $\omega_s$ with curves 23, 24 and 25. In FIG. 3, $\theta$ is extended through a range of values and the relationship is shown by means of a polar plot of $k$ as a function of $\theta$ in a plane view. Thus, 31 represents the reference vector H of the applied magnetic field. Vector 32 represents the magnitude of the wave vector $k$ and its direction relative to H as $\theta$ varies. For small values of $\theta$, both positive and negative, $k$ decreases with increasing rate as $\theta$ increases. The plot 33 corresponds to that known in optical and electromagnetic propagation arts as a "wave vector surface." In these arts the propagation of a beam of energy or a ray is determined by the group velocity vector whose direction in an anisotropic medium as here considered is not necessarily the same as the wave vector $k$. The wave vector $k$ is normal to the wave front. The group velocity vector associated with a given wave vector on the other hand is normal to the wave vector surface at its intersection with the given wave vector. See for example, "Electrodynamics of Continuous Media" by Landau and Lifschitz, Pergamon Press, London, 1960, Section 77. The same is true for magnetoelastic waves. Therefore, the vector 34 normal to surface 33 at its intersection with wave vector 32 represents the new or deflected direction of a wave initially launched according to vector 32 at an angle $\theta$ to the field direction H. Within the range of strong magnetoelastic coupling, increasing the strength of the field increases the difference between maximum and minimum values of $k$ and therefore the rate of change of the wave vector surface. Thus, it is seen that the initial wave entering the material along a path at a small angle to the biasing magnetic field is deflected away from the magnetic axis by an amount dependent upon the angle and also upon the strength of the magnetic field such that the entering path lies between the new path and the field direction.

As the angle $\theta$ becomes larger, coupling between elastic and spin waves ceases and the wave is no longer deflected. This is represented by the break in the wave vector surface 33. A second mode of operation occurs when $\theta$ is slightly less than 90 degrees ($k$ perpendicular to H) and the filed strength previously defined by Equation 2 is now defined by $$\omega_{cr} = \gamma H_i \sqrt{1 + \frac{4\pi M_s}{H_i}} \quad (3)$$

where $M_s$ is the saturation magnetization. The new value of $k$ is represented by 36 on FIG. 3. Increasing $\theta$ causes $k$ to decrease at a decreasing rate until $\theta$ equals 90 degrees. Thus, an initial wave having a direction represented by vector 37 at an angle somewhat less than 90 degrees to the field direction is again deflected away from the field as represented by the vector 38. If $\theta$ is increased beyond 90 degrees the direction of deflection when related to the negative direction of the applied field is again away from the field.

While the dispersion curves of FIG. 2 and the portion of the wave vector surfaces 33 and 36 of FIG. 3 are specific only to transverse elastic waves operating upon the upper branch of the dispersion diagram with smaller and larger angles $\theta$, respectively, it can now be pointed out that the principles of the invention include other modes of operation. Most obvious in this connection are operations with transverse elastic waves on the lower branch characterized by curves 26, 27 and 28 of FIG. 2 with small and large angles $\theta$. In particular, a total of eight modes can be identified including in addition to the four already enumerated, the corresponding four associated with longitudinal elastic waves. While each of these modes will depend upon an unique region of one of six wave vector surfaces each having its own characteristic form and shape, the magnetoelastic wave will be deflected in a direction away from the biasing field according to the same principles described in detail above.

It was mentioned above that transducer 12 may generate and receive linearly polarized shear or transverse modes, circularly polarized shear modes or longitudinally polarized modes of vibration. If the linearly polarized modes are employed, only one-half of their energy will be deflected in accordance with the invention. In particular, only the circularly polarized component of the linear wave having a particular sense of rotation with respect to the biasing field will be coupled with the spins as magneto-elastic waves. Circularly polarized components of the opposite sense will continue as elastic waves along path 13. Analogy may appropriately be drawn between this situation and double refraction in optical birefringence in which an entering optical ray is broken into ordinary and extraordinary rays. The deflected magnetoelastic waves correspond to the extraordinary optical rays and the undeviated elastic waves correspond to the ordinary optical rays. In certain applications of the invention it may be desirable to absorb the "ordinary" elastic wave by appropriate means known to the art. On the other hand their presence may be eliminated by originally launching only a circularly polarized elastic mode of appropriate sense. Known transducers for generating such a mode are disclosed by Raba A. Shahbender in the I.R.E. Transactions on Ultrasonics Engineering, volume UE–8, March 1961 at page 21 or by Bommel and Dransfeld in the Physical Review Letters, volume 3, July 15, 1959 at page 83 or in the copending application of R. T. Denton et al., Serial No. 226,381, filed September 26, 1962. Finally, longitudinal modes will be fully coupled as magnetoelastic waves and there will be no components corresponding to the "ordinary" wave. Suitable longitudinal mode transducers are described by T. R. Meeker in I.R.E. Transactions on Ultrasonics Engineering, volume UE–7, June 1960, page 53.

Ultrasonic wave deflection in accordance with the invention has numerous useful applications, a selected few of which will now be described by way of example. A first of these is inherent in the combination illustrated in FIG. 1 by means of which a variable delay is introduced to a return or echo pulse. Thus, by increasing either the angle $\theta$ or the absolute magnitude of $H_2$ or both, the inclination of path 15 to faces 11 and 14 is increased, increasing its length, and increasing the delay between the time a pulse is launched by transducer 12, is reflected from face 14, and returns to the transducer.

FIG. 4 illustrates a delay line structure having separate input and output transducers and further illustrates a typical means for applying an appropriately variable magnetic field. A rectangular plate 40 of gyromagnetic material which has a length substantially greater than its width is provided with an input transducer 42 similar to transducer 12 in FIG. 1 at one end of one of the longer faces of plate 40. The opposing area of the other face is loaded with appropriate elastic wave absorbing material 43 to dissipate without reflection any components of elastic wave energy which are not deflected. If mode selection as described above is employed to eliminate these residual elastic wave components, absorber 42 is unnecessary. To the right of absorber 43 is located an elongated transducer element 44 extending for substantially the remainder of the length of plate 40 and otherwise identical to transducer 42.

A typical structure for supplying the required magnetic field comprises a first pair of either permanent or electromagnetic poles 45 and 46 which applies a steady field transverse to the length of plate 40. A solenoid 47 having pole pieces 48 and 49 applies a field along the length of plate 40 that is variable in response to the setting of potentiometer 50 connected across direct-current supply 51. With the magnetic polarities indicated on the drawing, the resultant field progressively inclines to the left and increases in magnitude as the field between poles 48 and 49 is increased. This causes increased deflection of magnetoelastic beam 52 toward more remote portions of transducer 40 which increases the delay.

In FIG. 5 a plurality of individual output transducers 53 through 58 oppose input transducer 42 and replace elongated transducer 44 of FIG. 4. Progressively inclining fields as schematically represented by the vectors $H_1$ through $H_6$ will cause beam 52 to switch between successive output transducers 53 through 58, respectively, thus coupling the signal to a desired output transducer.

FIG. 6 constitutes a multipath memory device with magnetic selectable read-in, read-out or erase. An elongated plate 60 of gyromagnetic material is provided with a first transducer 62 located near the center of face 64 thereof. Suitably bonded to the opposite face of plate 60 is a block 65 of nonmagnetic, elastic wave propagation material such as aluminum or an alloy thereof. An appropriate energy absorbing member 66 is located opposite transducer 62 on the top face 67 of block 65. At least one and preferably a large plurality of parallel shaded areas 68 through 70 represent individual energy storage paths in which a pulse, or train of information-bearing pulses, introduced into a given path will be multiply reflected between faces 64 and 67 until eventually dissipated by losses in the materials or until otherwise coupled out. Progressively inclining fields $H_1$, $H_2$ or $H_3$ deflect the wave launched by transducer 62 to couple it respectively to paths 68, 69 or 70. As a specific example, the dotted lines define paths upon the application of $H_2$ which couples transducer 62 along path 71 to storage path 69. The remaining paths will be deflected as represented by 72 and 73 so that none of these will be coupled to transducer 62. In operation the single transducer 62 may be used to read-in, read-out or erase information in any of the storage channels. Alternatively, individual transducers 74 may be coupled to each channel to perform one or the other of these operations depending upon the particular application. For example, information may be read into each channel simultaneously by transducers 74 and then read out sequentially by transducer 62. Any of the transducers if lightly coupled to the system may read out without completely removing the circulating information while a tightly coupled transducer will remove or erase substantially all information.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. In combination, an elastic wave transmission medium, means for launching an elastic wave for propagation in a first direction within said medium, and means interposed in said medium in the path of said wave for deflecting the direction of propagation of a substantial portion of said wave from said first direction to a second direction, said last mentioned means comprising a body of nonconductive ferromagnetic material magnetized with a principal component of magnetization extending in a third direction at an angle to both said first direction and said second direction with said first direction lying between said second and third directions.

2. In combination, an elastic wave transmission meium, means for launching an elastic wave propagating in a first direction within said medium, means for receiving an elastic wave propagating in a second direction different from said first direction, and means interposed between said launching and receiving means for deflecting the direction of propagation of a substantial portion of said wave from said first to said second direction, said last mentioned means comprising a body of nonconductive ferromagnetic material magnetized in a third direction at an angle to both said first direction and said second direction with said first direction lying between said second and third directions.

3. In combination, an elastic wave transmission medium comprising a body of nonconductive ferromagnetic material, means for launching an elastic wave propagating in a first direction within said medium, means for receiving an elastic wave propagating in a second direction different from said first direction, and means for applying to said body a magnetic field extending in a third direction at at acute angle to both said first direction and said second direction for deflecting the direction of propagation of a substantial portion of said wave from said first direction to said second direction, said field having a strength which biases said material into the region of magnetoelastic interaction at the frequency of said elastic waves.

4. In combination, an elongated member of nonconductive ferromagnetic material having gyromagnetic properties, a first transducer means connected to one surface of said member for initially launching an elastic wave along an axis passing through said transducer, a second transducer means connected to a surface opposing said one surface and extending to one side of said axis, and means for applying a magnetic field to said member at an acute angle to said axis, said field having a strength which biases said material into the region of magnetoelastic interaction at the frequency of said elastic waves.

5. The combination according to claim 4 including means for varying said acute angle.

6. The combination according to claim 4 wherein said second transducer means comprises a plurality of individual transducers.

7. The combination according to claim 4 including means for absorbing elastic wave energy disposed on said opposing surface on said axis.

8. In combination, an elastic wave transmission medium having different adjacent portions each capable of supporting an elastic wave, at least one of said portions adjacent to all of the other of said portions comprising nonconductive ferromagnetic material, means for alunching an elastic wave within said medium, and means for selectively directing said wave into one of said different portions, said last-named means including means for applying a magnetic field to said one portion at selectively different angles to deflect said wave alternatively into said different portions.

No references cited.

ROY LAKE, *Primary Examiner.*

D. R. HOSTETTER, *Assistant Examiner.*